United States Patent
Henty

(10) Patent No.: US 7,535,424 B2
(45) Date of Patent: May 19, 2009

(54) PASSIVE WIRELESS KEYBOARD POWERED BY KEY ACTIVATION

(76) Inventor: David L. Henty, 19900 MacArthur Blvd., Suite 1150, Newport Beach, CA (US) 92612

( * ) Notice: Subject to any disclaimer, the term of this patent is extended or adjusted under 35 U.S.C. 154(b) by 15 days.

(21) Appl. No.: 11/710,839

(22) Filed: Feb. 26, 2007

(65) Prior Publication Data

US 2007/0200778 A1    Aug. 30, 2007

Related U.S. Application Data

(60) Provisional application No. 60/777,538, filed on Feb. 28, 2006.

(51) Int. Cl.
*H01Q 1/24* (2006.01)
(52) U.S. Cl. .................. 343/702; 361/680
(58) Field of Classification Search ............. 343/702, 343/850, 853; 361/680; 340/10.3, 10.41, 340/928; 341/20, 22, 173
See application file for complete search history.

(56) References Cited

U.S. PATENT DOCUMENTS

| | | | |
|---|---|---|---|
| 5,508,719 A * | 4/1996 | Gervais | 345/157 |
| 5,911,529 A | 6/1999 | Crisan | |
| 6,133,833 A | 10/2000 | Sidlauskas et al. | |
| 6,373,469 B1 | 4/2002 | Chen | |
| 6,388,561 B1 | 5/2002 | Tuttle | |
| 6,828,902 B2 * | 12/2004 | Casden | 340/10.3 |
| 6,850,227 B2 * | 2/2005 | Takahashi et al. | 345/169 |
| 6,902,332 B2 * | 6/2005 | McLoone | 400/472 |
| 6,967,835 B2 * | 11/2005 | Chiang | 361/686 |
| 7,006,014 B1 * | 2/2006 | Henty | 341/22 |
| 2003/0093791 A1 | 5/2003 | Julia et al. | |
| 2004/0233172 A1 * | 11/2004 | Schneider et al. | 345/168 |
| 2006/0017545 A1 * | 1/2006 | Volpi et al. | 340/10.4 |
| 2006/0232558 A1 * | 10/2006 | Chien | 345/168 |

\* cited by examiner

*Primary Examiner*—Hoang V Nguyen

(57) ABSTRACT

A wireless controller, such as a keyboard, and reader combination comprises a controller having a plurality of keys, one or mechanical to electrical energy converters providing energy from key activation, an antenna, and one or more passive transponder circuits, coupled to the antenna and associated with the keys. The passive transponder circuits provide a coded response identifying a key in response to key activation employing power from the key activation to modulate the interrogating field. In particular backscatter modulation using the reflected interrogating field may be employed. An associated reader includes a source of the interrogating field applied to the antenna of the keyboard and a decoder for determining the coded response from the passive transponder circuits.

20 Claims, 6 Drawing Sheets

PASSIVE WIRELESS KEYBOARD POWERED BY KEY ACTIVATION

RELATED APPLICATION INFORMATION

The present application claims the benefit under 35 USC 119(e) of Provisional Application Ser. No. 60/777,538 filed Feb. 28, 2006, the disclosure of which is incorporated herein by reference in its entirety.

BACKGROUND OF THE INVENTION

1. Field of the Invention

The present invention relates to wireless keyboards and computer systems employing wireless keyboards and methods of wireless text input to computer systems. The present invention further relates to wireless controllers and related control methods.

2. Description of the Prior Art and Related Information

Wireless keyboards have a number of advantages over the more common wire connected keyboards employed in computer systems. First of all, wireless keyboards offer more flexibility to the user to position him or her self relative to the computer. This can reduce strain and tiredness associated with computer use. Also, wireless keyboards reduce the amount of wires connected over or around a desktop and reduce clutter and complicated wiring tangles. This also creates a cleaner look to the overall system and can give the computer system a more sophisticated and/or expensive look. This avoidance of wiring becomes increasingly significant as more add on peripherals are included in typical computer systems which can result in workplace clutter.

The wireless keyboards currently available are either infrared based or RF based transmission systems. The infrared systems are the simplest and least expensive, however, they require a line of sight to the receiver. This can result in inconsistent transmission as the keyboard is moved or if other objects block the transmission path. RF systems do not suffer from this problem but are more expensive than infrared systems. In particular, the reliability of transmission in RF systems at a given range depends on the RF frequency and the power and quality of the transmitter. Therefore, maintaining transmission reliability requires more expensive higher frequency transmitters and/or higher power transmitters. Nonetheless, RF systems are increasingly being used for wireless keyboards over infrared systems due to their performance advantages.

Undoubtedly the primary reason that wireless keyboards have not displaced wire connected keyboards to a greater extent is the need for replacing batteries. When batteries fail in a wireless keyboard computer system the system is useless until the batteries are replaced. This is obviously a significant inconvenience when the battery failure is not expected. Also, keyboards typically continuously scan the matrix of keys to detect key depression. Therefore, even when there is no data entry from the keyboard battery power is being used for key scanning. Therefore, battery lifetime is inherently limited in wireless keyboards.

As a result of these limitations wireless keyboards have not been able to fulfill the potential of replacing wired keyboards in computer systems.

SUMMARY OF THE INVENTION

Figure 1A:
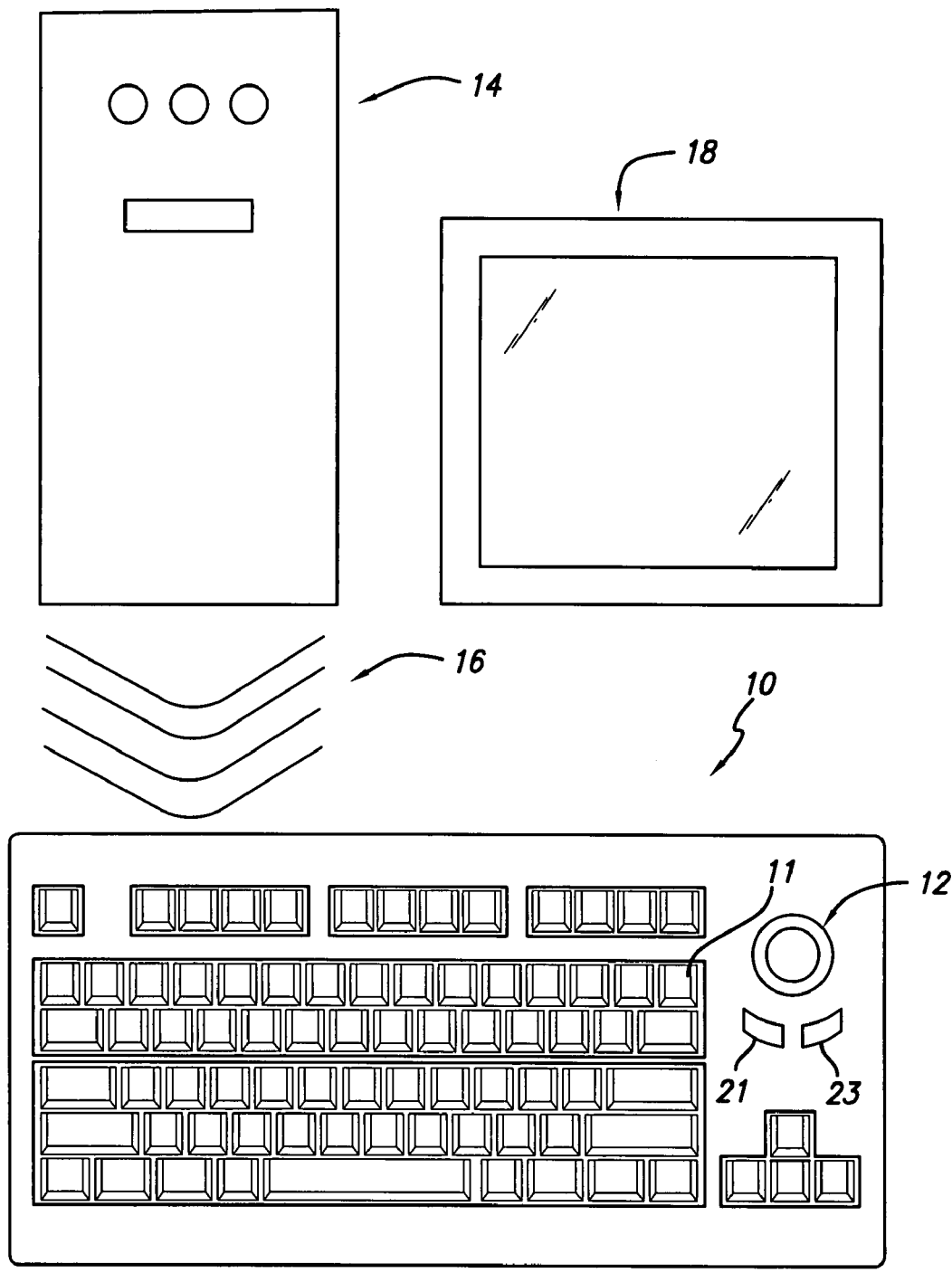
FIGS. 1A and 1B are a drawings of a computer system with a passive wireless keyboard in accordance with two embodiments of the present invention.

In a first aspect the present invention provides a computer system, comprising a monitor, a processor, a reader comprising a source of an interrogating field and a decoder, and a wireless keyboard having a plurality of keys. The keyboard includes one or more transponders, one or more mechanical to electrical energy converters responsive to key activation and providing power to the one or more transponders, and one or more antennas coupled to the one or more transponders and modulating the interrogating field with a coded signal in response to key activation.

In a preferred embodiment the one or more mechanical to electrical energy converters comprise one or more piezoelectric transducers or one or more magnetic transducers. The transponders preferably operate without employing power from the interrogating field or a battery. The one or more antennas may comprise plural antennas each respectively coupled to plural keys. For example, the one or more antennas may comprise a multi-element antenna array. The keyboard may have a multi-layer structure and the one or more antennas may comprise plural antennas configured on a separate layer from the mechanical to electrical energy converters. The one or more antennas may also comprise one or more antennas configured on a separate layer from said transponders. Modulating the interrogating field may comprise backscatter modulation employing reflecting said interrogating field.

In another aspect the present invention provides a wireless controller system, comprising a reader comprising a source of an interrogating field and a decoder; and a wireless controller. The wireless controller has one or more manually activated inputs, one or more transponders, one or more mechanical to electrical energy converters, and one or more antennas coupled to the one or more transponders and modulating the interrogating field with a coded signal in response to activation of an input employing energy from the one or more mechanical to electrical energy converters.

In a preferred embodiment the one or more mechanical to electrical energy converters may comprise one or more piezoelectric transducers or one or more magnetic transducers. Modulating the interrogating field may comprise backscatter modulation employing reflecting said interrogating field.

In another aspect the present invention provides a method for short range wireless transmission of data between a controller having one or more manually activated inputs and one or more antennas, wherein the one or more antennas are adapted to couple to an interrogating field, and a receiver. The method comprises providing an electromagnetic interrogating field, modulating the interrogating field with a coded response employing energy from activation of the one or more inputs, and detecting the modulated reflected field at the receiver.

In a preferred embodiment of the method for short range wireless transmission, modulating the interrogating field may comprise backscatter modulation employing reflecting said interrogating field. The controller may comprise a keyboard and the inputs may comprise keys. The energy from activation of the one or more inputs may be provided from one or more piezo-electric transducers coupled to said inputs or from one or more magnetic transducers coupled to the inputs. Modulating the interrogating field is preferably done without employing power from the interrogating field or a battery. As one example the receiver may be configured in a computer and the data keyboard key data.

Further aspects of the invention are set out in the following detailed description.

DETAILED DESCRIPTION OF THE INVENTION

The present application hereby incorporates by reference the disclosures of U.S. Pat. Nos. 5,838,138, 6,094,156, U.S. patent application Ser. No. 09/978,615 filed Oct. 16, 2001 (U.S. Pat. No. 7,006,014), U.S. patent application Ser. No. 10/003,778 filed Oct. 31, 2001 and Ser. No. 10/027,369 filed Dec. 20, 2001.

Figure 1B:
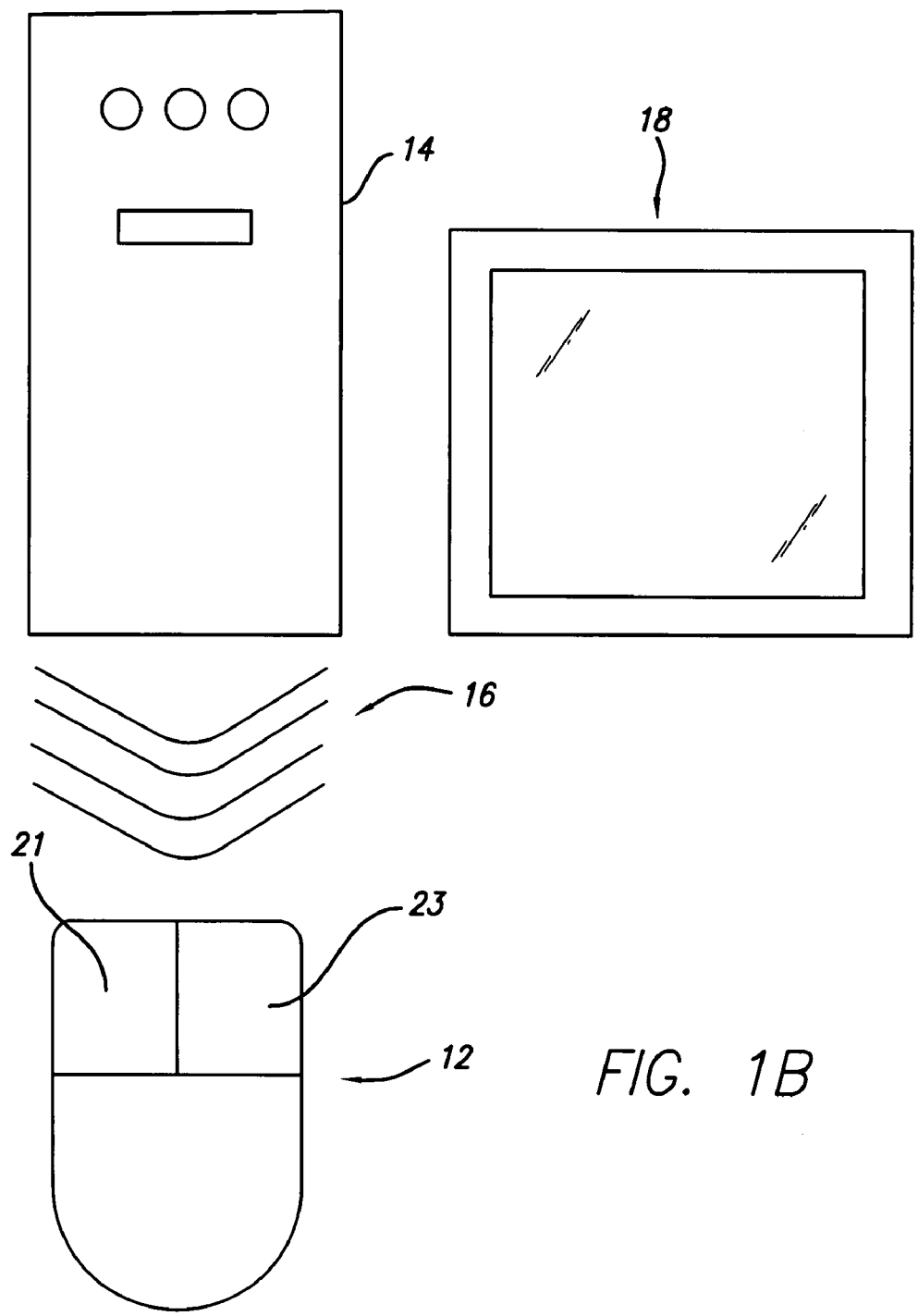
Figure 2:
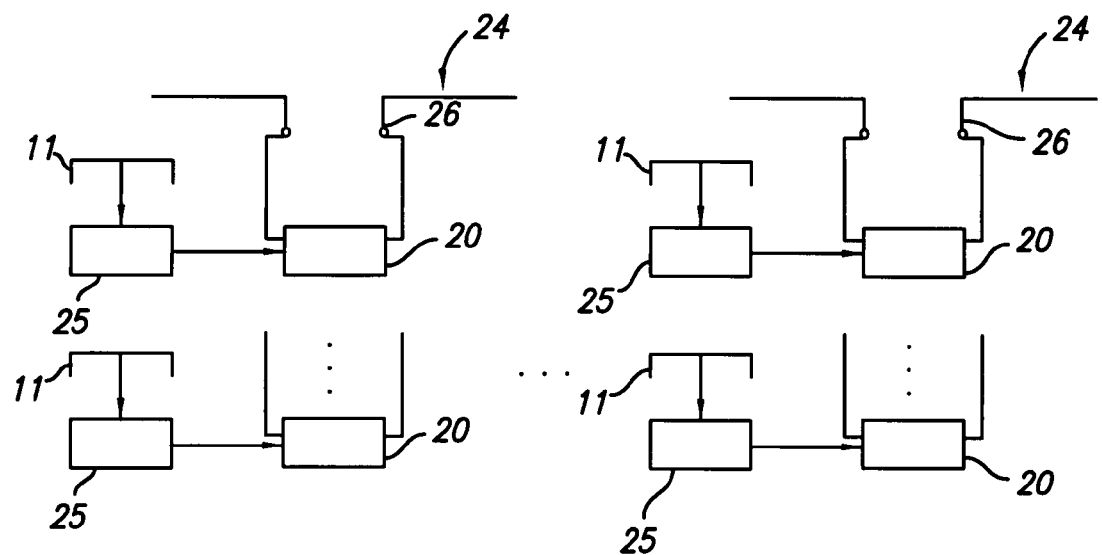
FIG. 2 is a cutaway view of the wireless keyboard of FIG. 1A or 1B illustrating the transponder ID tags and antenna employed in the keyboard.

Referring to FIGS. 1A, 1B, and 2, a computer system incorporating a passive wireless keyboard 10 and a wireless mouse 12 is illustrated. Keyboard 10 may be a QWERTY keyboard of an integral one piece conventional construction or may incorporate a folding design such as disclosed in the above noted '156 patent. The computer system as illustrated also includes a housing 14 which includes the processor, hard disk drive, and other components in a conventional computer system, as well as a reader unit which is the source of an interrogating field 16 which is used to interrogate the passive keyboard 10 and receive wireless transmission from wireless mouse 12. The wireless mouse may employ passive or active wireless transmission as described below. The computer system also includes a monitor 18 which may be a CRT or LCD type of display or other display known in the computer art. Interrogating field 16 is an RF field generated by the reader and applied to a suitable antenna, contained within housing 14. Optionally the reader and/or the antenna may be contained within monitor 18. Alternatively, the reader may be incorporated in an add-on unit which interfaces with the computer housing 14 through an available port, such as a USB port, or the keyboard input.

Each key 11 in keyboard 10 provides power to a passive transponder when a key is activated and the passive transponder provides a coded response to the reader which indicates the key activated. Each transponder corresponding to a given key in the keyboard 10 has a unique code identifying the key which is read by the reader and thus provides an identification of the specific key activation to the computer processor. The power from the key activation is provided via a mechanical to electrical converter 25 such as described in the above noted '138 patent. For example, a small magnet may be attached to each key which is driven into a wire coil coupled to the transponder or a piezo-electric transducer may be compressed by key activation. Due to the very low power requirements of passive transponder circuits and due to the lack of a need to power the antenna for signal transmission, small mechanical to electrical energy converters may be used reducing the cost and weight of the keyboard.

Figure 4:
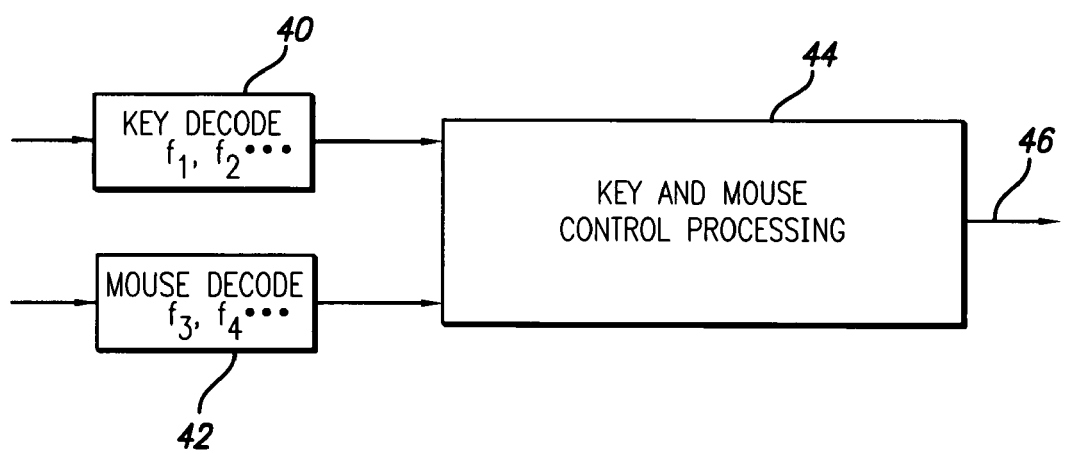
FIG. 4 is a block diagram of the tag reader electronics employed in the computer system of FIG. 1A or 1B.

A variety of passive transponder tags (or RFID tags) are known, however, most of these are limited in range. Such passive tags are primarily used in security systems and inventory tracking. Such tags typically include an antenna and integrated circuit which are combined in a small package and provided at a relatively low-cost. The antenna is used by the passive transponder to receive energy from the interrogating field which energy is used by the transponder to provide the coded response to the interrogating signal. The need for the passive transponder to receive energy from the interrogating field is a primary range limitation, often limiting the read range to a few cm where a small size inductive antenna is used in the reader to supply power. Longer range systems often employ very large reader antennas, for example, in passive RFID tag based security access systems or theft detection systems reader antennas are typically dimensioned on the order of size of a doorway or access portal. It is desirable to increase the range of the wireless keyboard without employing such large reader antennas. The use of key generated power eliminates this range constraint for all such RFID tag systems. The RFID Handbook, second edition, 2003, Wiley Pub., by Klaus Finkenzeller discloses details of various RFID tags and readers, the disclosure of which is incorporated herein by reference (the relevant portions thereof will be readily appreciated by those skilled in the art). In all such systems the tag includes a modulator powered by the incoming RF field and this power supply connection to the antenna may simply be replaced by a connection to the electrical output of the mechanical to electrical energy converter. Although as noted, various RFID tag designs may be employed, including electrostatic, inductive and backscatter systems, the latter may be preferred in many cases due to the smaller transmit antenna and possibility of greater read range. Various backscatter modulator circuit designs and approaches are known; for example, as set out in the above noted RFID Handbook (e.g., pages 143-145). In particular, a typical backscatter tag circuit is shown in figure 4.88 at page 145 thereof which includes a rectifier and power generation circuit which may be coupled to the energy converter 25 as described above in place of the tag antenna. (The tag circuit illustrated is more complex than needed in the present application since it includes a writable code capability and HV generation not needed in a keyboard application.) To reduce the chance of key interference a time based shut off feature may be included in the tag circuit to limit the modulation cycle to a few tens of milliseconds. In addition to these and other known teachings the teachings of U.S. Pat. No. 6,243,012 may be employed, the disclosure of which is incorporated herein by reference, which provides a simpler and less expensive modulator design. (Similarly to the above noted modification to the above noted tag circuit in the RFID Handbook, the power module shown in FIG. 2 of the '012 patent would be replaced with energy converter 25.) Also, non backscatter systems may be employed and several specific examples are described in the '615 application as well as the RFID Handbook. Selection of the system will involve the desired range and cost of the application. It should also be appreciated that the modulator circuitry may be configured on the keyboard directly via a circuit board rather than employing discrete RFID tags. Also, chipless RFID circuits have been developed and are commercially available, for example including transistor films including modulator circuits. Similarly the energy converters 25 may be provided in a film or combination of films and separate layers. For example a film with magnetic material in deformable regions aligned with the keys may be employed with a corresponding printed coil pattern aligned therewith on a circuit board. Printing of coil patterns is a known technique, see for example, the RFID Handbook, section 12.2.1, the disclosure of which is incorporated herein by reference. Also some or all of the energy converter 25 function and transponder 20 modulator function may be combined or integrated together. As one example a micromechanical switch and resonator could provide a suitable mechanical coupling responsive to the key activation and also provide an oscillator output to modulate the interrogating field. Such a combined structure could be integrated into a single chip. Design of various MEMs structures such as microresonators is known, for example, as described in The RF and Microwave Handbook, CRC Press (2001), chapter 6.4, the disclosure of which is incorporated herein by reference.

Referring in particular to FIG. 2 a portion of keyboard 10 is illustrated showing a particular exemplary layout with plural antennas and a portion of an array of passive transponder ID tags 20. Each tag 20 may have its own antenna. As antenna size can limit read range, however, it is generally desirable to have as large an antenna reflective signature as possible associated with each tag. This may be achieved by providing a common antenna to which is coupled a plurality of individual tags 20. This allows an antenna 24 to be dimensioned larger than in typical passive RFID applications up to substantially the entire size of the keyboard which can provide substantial increases in coupling to the interrogating field and corresponding increases in the read distance and read speed and integrity. Although the antenna 24 is illustrated as a simple dipole antenna 24 it will be appreciated that other antenna types are possible, including a multi-wire folded dipole. Also, the antenna 24 may be formed on a separate layer of the keyboard from the tags 20 with a connection 26 provided between the antenna layer and the layer on which the tags 20 are formed allowing the use of a patch antenna 24 or an antenna comprising an array of patches or microstrip lines. Whether the antenna 24 is on the same substrate as the tags 20 or a separate substrate the antennas may advantageously be formed using printed circuit board techniques to ease assembly and reduce costs.

Still referring to FIG. 2, in one embodiment of tag antenna 24 separate antennas 24 may be provided for different groups of keys. The number of separate antennas provided may be chosen to reduce or eliminate the possibility of simultaneously activated keys sharing an antenna during normal keyboard usage. This may reduce interference in the read operation between such simultaneously activated keys. For example, for a typical computer keyboard with CTRL, ALT and SHIFT keys adapted for use together with other keys, these may each be coupled to a separate antenna 24. A separate antenna 24 could then couple to the remaining keys, including all the text keys. Additional or fewer antennas may be provided for specific keyboard functionality. Alternatively, the antenna/key grouping may be chosen for optimal coupling and/or optimal layout of a printed circuit with the antennas and tag connections on the keyboard. For example, the keys may be coupled in columns to antennas arranged in rows along the top (as schematically illustrated) and bottom of the keyboard. Preferably, as noted above, the antennas in total exploit a substantial portion of the keyboard area to maximize read range.

Figure 3:
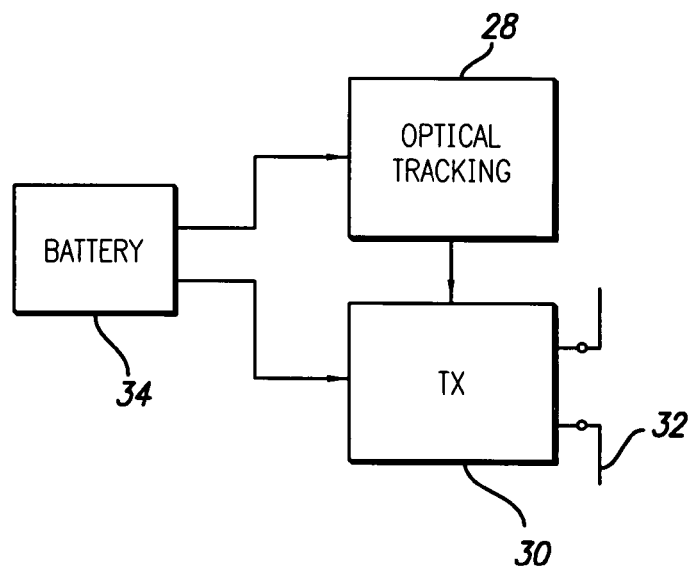
FIG. 3 is a schematic drawing of a circuit of the wireless mouse employed in one embodiment of the computer system of FIG. 1B.

Referring to FIG. 3, an implementation of a wireless mouse 12 circuit is illustrated. If mouse 12 employs mechanical position encoders the use of passive transmission of the position information may be employed as described in more detail in U.S. patent application Ser. No. 10/003,778 or the encoder may power a transmitter as disclosed in the '138 patent, which may also be an RFID tag based transmission. If an optical position encoder is desired an active backscatter transmission may be employed as shown in FIG. 3. A conventional optical tracking circuit 28 may be employed which is coupled to an active backscatter transmitter comprising modulator 30 and antenna 32. The active backscatter modulator may employ the same general design as passive backscatter modulators described above, e.g. the '012 patent or RFID Handbook, with the power provided from the battery and the modulation input coming from the position input rather than stored in an IC. The optical tracking circuit and modulator are powered by battery 34, however, the transmitter does not need to power the transmission through the antenna since backscatter/reflective transmission of the interrogating field is employed. This embodiment has the advantage of reduced power consumption over conventional wireless optical mouse systems which power RF transmission with a battery. Such systems are known to have relatively short battery lifetime and accordingly the extended battery lifetime with the present embodiment is a desirable improvement. Also, a shared reader may be employed with the wireless keyboard.

Referring to FIG. 4 a reader block diagram is illustrated. As noted above reader designs are known and are described in the above patents and in the above noted RFID Handbook, by Klaus Finkenzeller (chapter 11), and need not be described in detail herein; however, FIG. 4 illustrates aspects of the reader adapted for the present application. As shown the reader includes a key reader and decoder 40 and a mouse reader and decoder 42. If a modulated backscatter system is employed for both keyboard 10 and wireless mouse 12, the interrogating field will be continuous and appropriate reader circuits employed. These may each be operable at different frequencies. Also each may have plural frequencies f1-fn. Plural frequencies for the key reader may prevent interference from simultaneously operated keys and may be limited to commonly activated keys such as ctrl, shift, alt, etc. Mouse decoder in turn may use plural frequencies as described in the '778 application. Other techniques for preventing interference from multiple tags being read simultaneously are known and may be employed instead of assigning unique frequencies to the commonly activated tags. For example, a protocol where a tag issues a brief response in a unique time slot or where a random response timing is used can minimize inter-tag interference without separate frequencies.

The decoded key and mouse information is provided to control processing circuit 44 which converts the decoded information to conventionally formatted key and mouse control data which is provided to the computer processor on line 46. Some or all of the functions of circuit 44 (as well as some functions of decoders 40, 42) may be provided in the computer processor, however, and this may provide cost advantages.

Figure 5:
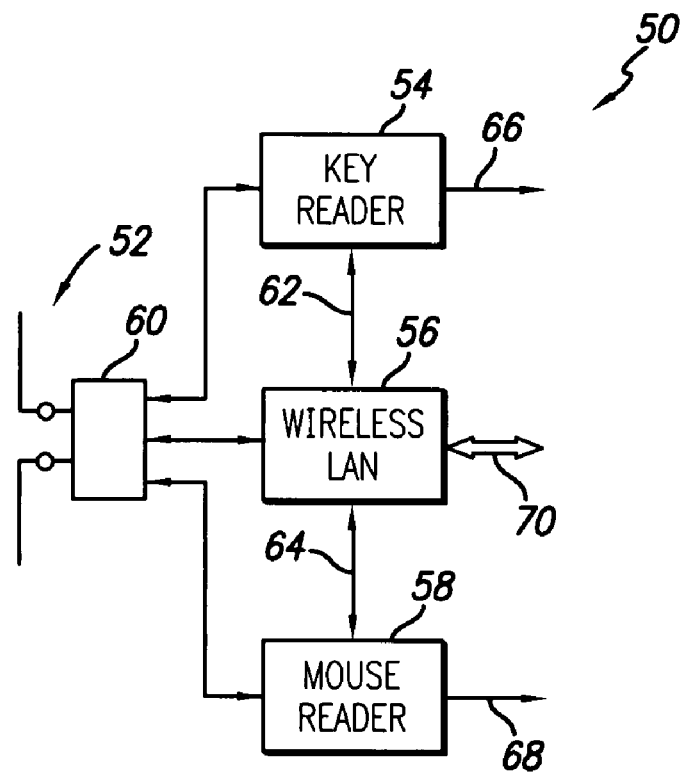
FIG. 5 is a block diagram of the tag reader in an alternate embodiment.

Referring to FIG. 5 a reader block diagram is illustrated which shares circuitry with a wireless networking circuit. Such wireless networking circuits are well known, for example as defined in the WiFi specification, and as used herein also includes systems such as Bluetooth. 2.45 GHz is a commonly used frequency for such systems and 2.45 GHz tags are also available. This combined circuit has advantages in space and cost for computer systems having such a wireless networking capability and for example the wireless network and key/mouse reader circuitry may be configured on a single circuit board. As shown the combined reader and wireless networking circuit 50 may include a shared antenna 52 coupled to key reader circuit block 54, wireless network circuit block 56 and mouse reader circuit block 58 via selective coupler 60. If the same antenna is used for transmit and receive the coupler may include a directional coupler and a switch (the double arrow lines may comprise separate signal paths from the directional coupler and are illustrated in this manner for convenience of illustration). The switching circuitry receives timing control signals from either of the circuit blocks which timing is communicated between the blocks via lines 62, 64. If the respective circuit blocks operate at different frequencies the selective coupler may also include filters to block the signal components of the other circuit blocks. The outputs of the key and mouse reader are provided to the computer system processor along lines 66, 68 and the wireless network bidirectional communication is along line 70. Although a shared antenna provides space advantages and some cost savings additional functions may be shared between circuit blocks. For example, circuit block 56 may control all transmit signals with separate decode blocks used for receiving and decoding functions. Alternatively, separate transmit circuits may be provided but a common decode block employed in circuit block 56. Finally, all functions may be implemented in a common block 56.

A discrimination processing may be implemented by the readers of FIG. 4 or 5 which allows multiple wireless keyboards to be used in relatively close proximity without interference. One such discrimination processing approach may employ using different codes in different keyboards and storing the valid codes for the keyboard in a table in the reader or computer system. In this approach the reader detects a coded response and compares it to the table of valid codes and accepts or rejects the key code. As in the prior approach this discrimination processing alternatively may be performed by the computer system processor. To allow switching of keyboards between computers the table may be stored in a nonvolatile memory on the keyboard accessible by the computer system via, e.g., a USB cable, or may be contained in a device driver, e.g., on a CD ROM or other storage, which ships with the keyboard.

Figure 6A:
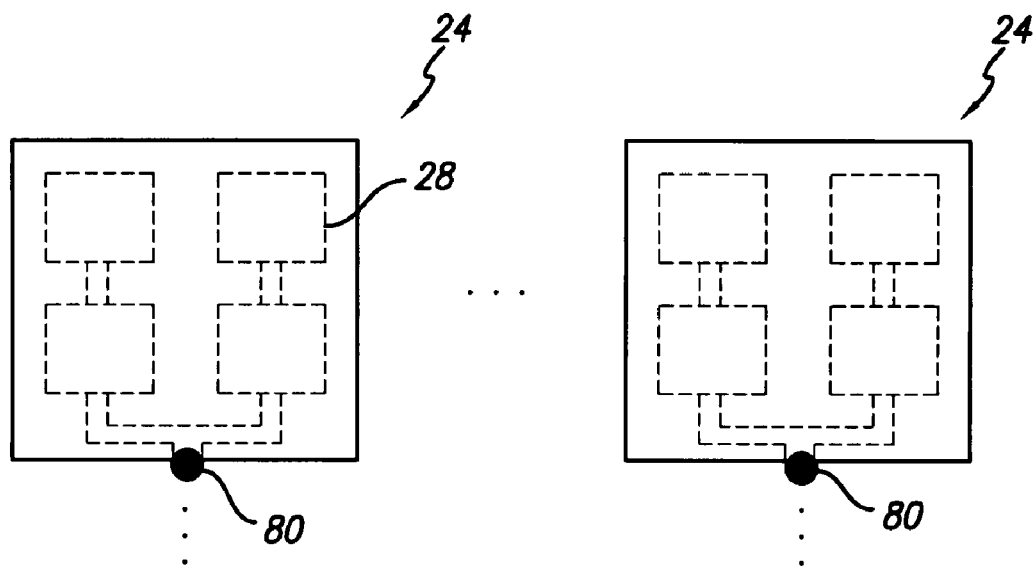
FIGS. 6A and 6B are top and sectional views of a multi-layer keyboard employing a planar antenna design.
Figure 6B:
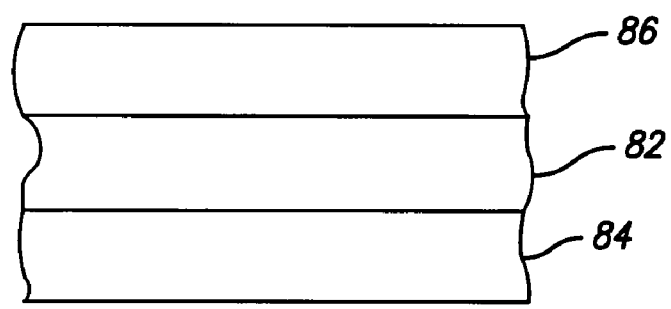

FIGS. 6A and 6B are top and side sectional views of a keyboard 10 employing a multi-layer structure and a planar antenna design. Referring first to FIG. 6A, a layer of keyboard 10 is illustrated employing a planar antenna pattern thereon. The generally planar tag antenna 24 may employ known patch antenna or multi-stripline designs which may be configured on the keyboard housing or part of the housing. For example, patch antenna designs are described in the above noted RFID Handbook (Chapter 4). The planar pattern may be generally split across the keyboard into columns or rows of antennas 24 or antenna elements 28. Other configurations are also possible. The antenna configuration will be chosen for the specific implementation to maximize reflective coupling to the interrogating field from the reader. A second layer of keyboard 10 may comprise tags 20 connected to the tag antenna by connection 26, and energy converters 25, as described in relation to FIG. 2 above. The tag layer 82 may be configured on top of the antenna layer 84 as illustrated in FIG. 6B and connection 26 (FIG. 2) may connect to antenna 24 through conductive vias 80. Tags 20, converters 25 and connection 26 may be formed on a suitable substrate. The layer 86 with the keys thereon (shown in FIG. 1A) is configured on top of the tag layer with the keys aligned with converters 25.

As noted above antenna 24 may be optimized for the transmission of the data back to the reader, for example, to transmit data via backscatter modulation. For example, if a 2.45 GHz interrogating field is used approximately a half wavelength antenna or antenna element dimension may be employed. In addition to a patch antenna, for example, antenna 24 may be a half wavelength dipole antenna array configured over a substantial portion of the keyboard to provide a strong reflected signal. Plural antennas 24 may also be provided each respectively coupled to one or more circuits as described above. Plural antennas 24 may also be provided each respectively having a different orientation to reduce sensitivity to keyboard orientation. Also, other antenna designs may be employed, e.g., a bowtie antenna, multi-element half wavelength dipole, or folded dipole antenna design may be employed.

It will be appreciated from the foregoing that the above described embodiments are purely illustrative examples and a variety of different implementations of both the system employing the keyboard, the reader and the keyboard itself are possible. For example, with respect to the overall system, depending on the keyboard read range of the system as implemented, the system employing the keyboard may also comprise an entertainment system as described in the above noted '156 patent, incorporated herein by reference, with the keyboard providing remote control input functions as described therein. Such an entertainment system may include a game system and the keys game control keys. A game controller is illustrated in the '138 patent and may be employed herein in wireless operation. Also, a variety of computing devices such as so called internet appliances and other desktop systems may employ the invention.

Figure 7:
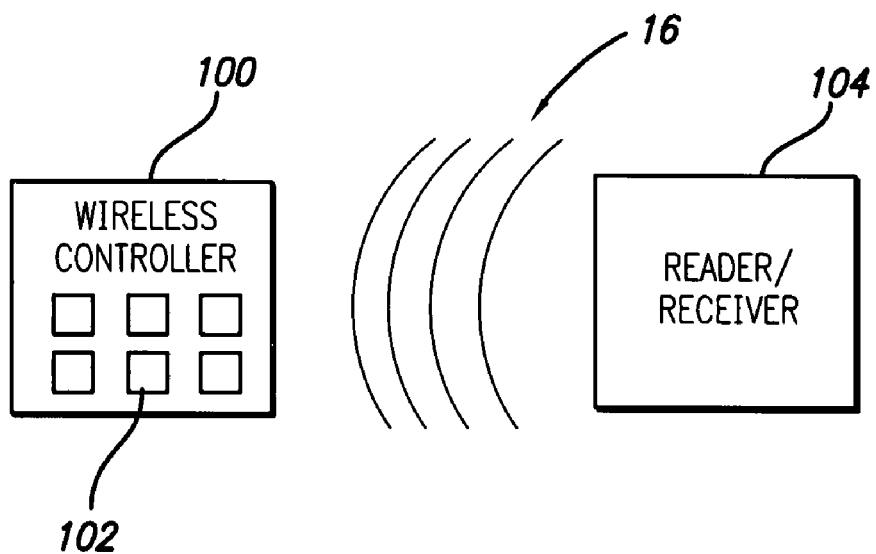
FIG. 7 is a schematic drawing of a wireless controller in accordance with the present invention.

Also, simpler controllers may employ the manually activated tag and reader as described with the manually activated input powering the tag circuit as described to wirelessly initiate a control function with a coded response. Such a controller is generally illustrated in FIG. 7. The controller 100 may have a single manual input 102 such as a key or switch or plural manual inputs. Reader 104 operates as described above and includes a suitable antenna and reader electronics. Examples of such a controller include a wireless control device for home or office such as a light switch, home automation control, or wireless sensor for door or window for home or office security systems. In the latter case the power from the manual input may be provided by releasing the manual input, held under tension when the door or window is closed with a spring or other bias means, rather than pressing the manual input as in the prior examples. Other examples of such a controller application include keyless entry systems for homes or automobiles. A variety of other applications are also possible.

Variations in the reader and tag implementations and layouts in turn are too numerous to describe in detail including a variety of different combinations of transmission schemes, antenna designs, modulation schemes, frequency ranges, etc.

What is claimed is:

1. A computer system, comprising:
    a monitor;
    a processor;
    a reader comprising a source of an interrogating field and a decoder; and
    a wireless keyboard having a plurality of keys, one or more transponders, one or more mechanical to electrical energy converters responsive to key activation and providing power to said one or more transponders, and one or more antennas coupled to said one or more transponders and modulating said interrogating field with a coded signal in response to key activation.

2. A computer system as set out in claim 1, wherein said one or more mechanical to electrical energy converters comprise one or more piezo-electric transducers.

3. A computer system as set out in claim 1, wherein said one or more mechanical to electrical energy converters comprise one or more magnetic transducers.

4. A computer system as set out in claim 1, wherein said transponders operate without employing power from the interrogating field or a battery.

5. A computer system as set out in claim 1, comprising plural antennas each respectively coupled to plural keys.

6. A computer system as set out in claim 1, wherein said one or more antennas comprise a multi-element antenna array.

7. A computer system as set out in claim 1, wherein said keyboard has a multi-layer structure and wherein said one or more antennas comprise plural antennas configured on a separate layer from said mechanical to electrical energy converters.

8. A computer system as set out in claim 1, wherein said keyboard has a multi-layer structure and wherein said one or more antennas comprise one or more antennas configured on a separate layer from said transponders.

9. A computer system as set out in claim 1, wherein modulating said interrogating field comprises backscatter modulation employing reflecting said interrogating field.

10. A wireless controller system, comprising:
    a reader comprising a source of an interrogating field and a decoder; and
    a wireless controller having one or more manually activated inputs, one or more transponders, one or more mechanical to electrical energy converters, and one or more antennas coupled to said one or more transponders and modulating said interrogating field with a coded signal in response to activation of an input employing energy from said one or more mechanical to electrical energy converters.

11. A wireless controller system as set out in claim 10, wherein said one or more mechanical to electrical energy converters comprise one or more piezo-electric transducers.

12. A wireless controller system as set out in claim 10, wherein said one or more mechanical to electrical energy converters comprise one or more magnetic transducers.

13. A wireless controller system as set out in claim 10, wherein modulating said interrogating field comprises backscatter modulation employing reflecting said interrogating field.

14. A method for short range wireless transmission of data between a controller having one or more manually activated inputs and one or more antennas, wherein the one or more antennas are adapted to couple to an interrogating field, and a receiver, the method comprising:
    providing an electromagnetic interrogating field;
    modulating the interrogating field with a coded response employing energy from activation of the one or more inputs; and
    detecting the modulated reflected field at the receiver.

15. A method for short range wireless transmission of data as set out in claim 14, wherein modulating said interrogating field comprises backscatter modulation employing reflecting said interrogating field.

16. A method for short range wireless transmission of data as set out in claim 14, wherein said controller comprises a keyboard and said inputs comprise keys.

17. A method for short range wireless transmission of data as set out in claim 14, wherein energy from activation of the one or more inputs is provided from one or more piezo-electric transducers coupled to said inputs.

18. A method for short range wireless transmission of data as set out in claim 14, wherein energy from activation of the one or more inputs is provided from one or more magnetic transducers coupled to said inputs.

19. A method for short range wireless transmission of data as set out in claim 14, wherein modulating said interrogating field is provided without employing power from the interrogating field or a battery.

20. A method for short range wireless transmission of data as set out in claim 14, wherein said receiver is configured in a computer and the data comprises keyboard key data.

* * * * *